3,017,396
COPOLYMERS OF VINYL CHLORIDE AND ALKOXYALKYL ESTERS

Lester H. Arond, Leominster, William J. Salem, Worcester, and Harry Wechsler and Samuel Makower, Leominster, Mass., assignors to The Borden Company, a corporation of New Jersey
No Drawing. Filed Apr. 29, 1958, Ser. No. 731,627
2 Claims. (Cl. 260—78.5)

This invention relates to internally plasticized copolymers of vinyl chloride and alkoxyalkyl esters of unsaturated carboxylic acids.

We have made such copolymers and discovered the surprising and unexpected property of their being practically unattacked by aliphatic hydrocarbon liquids. This property makes possible the preparation of vinyl resins that may be formed into articles resistant to such solvents as gasoline, kerosene, and mineral spirits.

Our products are also light in color, stable in milling, calendering, extrusion, and molding operations.

With these copolymers we are now able to make vinyl floor tile that, for the first time, is tough and flexible and from which stains, resulting from contact with oils, greases, asphalt, and shoe polish, are readily and safely washed away by common household organic cleaning fluids.

Briefly stated, the invention comprises the herein described copolymers of alkoxyalkyl esters of unsaturated carboxylic acids with (1) vinyl chloride or (2) vinyl chloride mixed with other copolymerizable monomers.

The alkoxyalkyl group of the esters to be used and copolymerized is $RO(R'O)_n$— in which R is an alkyl group having 1–4 carbon atoms and R' is an alkylene group having 2–4 carbon atoms.

The formula for the monomeric acrylate ester is therefore, $CH_2=CH—CO—(OR')_n—OR$.

Specific examples of R in this formula are methyl, ethyl, isopropyl, and butyl. R' is ethylene, propylene, or butylene and $n$ is an integer within the range 1–10, normally 1–3.

The monomers to be copolymerized with the alkoxyalkyl esters include vinyl chloride, i.e., vinyl chloride alone or mixed with comonomers such as vinyl acetate, butyrate, and 2-ethylhexoate and such as $C_2$–$C_{12}$ alkyl esters of maleic, fumaric, acrylic, methacrylic, crotonic, itaconic, and citraconic acids. The proportion of these comonomers when used varies from 10–100 parts for 100 of the vinyl chloride. The proportions of the alkoxyalkyl ester will vary with the extent of internal plasticization required. We find suitable proportions to be 10–100 parts and for most purposes 20–60 parts of the said ester for 100 of the vinyl chloride.

The copolymerization of our materials is made to advantage in solution, emulsion, or suspension, by general techniques well known in the art. Emulsifying agents that are used in emulsion polymerization technique may be of the anionic, cationic or nonionic types. Suspending agents, for suspension polymerization, are similarly chosen from the hydrophilic colloids customarily employed for like purpose, as, for example, polyvinyl alcohol, gelatin, methyl cellulose, and starch. The polymerization initiators employed are those conventionally used in emulsion and suspension systems, examples being potassium persulfate, benzoyl peroxide and azo-bis-isobutyronitrile, the latter two being for suspension polymerization. Redox catalysts, such as a combination of persulfate and bisulfite salts, are used for emulsion systems and any known amine activator for the organic peroxides is used in the suspension systems.

Modifiers or chain transfer agents may be used to obtain products of varying molecular weights. We have found a particular class of modifiers, the mercaptans, to be especially effective in improving the processability and flexibility or rubberiness of those of our internally plasticized copolymers from predominantly unconjugated monomers. For example, copolymers of vinyl chloride with Cellosolve acrylate or methyl Carbitol acrylate, made with no mercaptan, were much stiffer and more difficult to process than the same copolymers made with mercaptans. These results were unexpected since the mercaptans in polymerization produce practically no effect on the intrinsic viscosity of a straight polyvinyl chloride resin. Although mercaptans have been used with conjugated monomers such as butadiene, isoprene, methyl methacrylate and acrylonitrile, they are not effective in systems, containing predominantly unconjugated monomers, in giving our results therewith. The mercaptan to be used is any one that is soluble in the mixture of monomers to be copolymerized and the mercaptan and that contains 2–20 carbon atoms for 1 —SH(mercapto) groups as in tertiary butyl mercaptan and n-hexyl mercaptan. Suitable proportions of the mercaptan are 0.1–2 parts for 100 of the said mixture.

The said mixture is maintained at 30°–60° C. until the vapor pressure falls and becomes substantially constant.

When the alkyl group is from the upper part of the $C_2$–$C_{12}$ range, the proportion of the alkyl ester to be used is in the lower part of the range 10–100 parts if the swelling of the final product in aliphatic hydrocarbons is to be prevented.

When a mercaptan is used, the proportion is about 0.1%–2% of the weight of monomers to be copolymerized.

The product of the polymerization, if an emulsion, may be used for coating, dipping, or spraying fabrics, metal or wood objects. Alternatively, the product, whether emulsion or suspension, may be dewatered and dried in any convenient manner, for use in calendering, extruding, and molding operations.

When fillers are used, as in making floor tile, the filler is a solid material that is finely divided and is chemically inert and insoluble in the resin composition and in any liquid or solid component compounded therewith. Examples of such fillers that we use are powdered calcium carbonate or clay, wood flour, and asbestos fibers. Suitable proportions are 40–400 parts for 100 of the copolymer of vinyl chloride used. The filler and copolymer are blended in any convenient manner.

The invention will be further illustrated by the following specific examples. In these examples and elsewhere herein, proportions are expressed as parts by weight.

Example 1

Pressure vessels are charged with the following materials.

| Ingredient: | Parts |
|---|---|
| Vinyl chloride | 18 |
| Vinyl acetate | 3 |
| 2-ethoxyethyl acrylate | 9 |
| Polyvinyl alcohol (dispersing agent) | 0.24 |
| Lauroyl peroxide (initiator) | 0.09 |
| Water | 68.9 |

The vessels are closed and the contents vigorously agitated at 57° C. for 15 hours. The yield of polymer is 95% of theory. The polymer is filtered, washed, and dried at 50° C.

A sample of this copolymer resin fused completely into a flexible translucent sheet at 120° C. and 5000 p.s.i. After 64.5 hours' immersion in hexane at 25° C., the weight increase was found to be 5.2%. A resin referred to below as polymer I and produced outside the invention but according to the above formula and technique, except that 2-ethylhexyl acrylate was used in place of the 2-ethoxyethyl acrylate, increased 82% in weight upon immersion in hexane under identical conditions.

A sample of the resin made with the ethoxyethyl acrylate was used as a binder in vinyl floor tiles. A mixture of the resin (40 parts) and calcium carbonate powder (60 parts) was milled at 125° C. The resulting product was tough, flexible, and unattacked by mineral spirits. The tile stained much less with black shoe polish, rubber heels or asphalt brought into contact with the tile than did a commercial externally plasticized tile. Whatever stains did result were readily removed by common household solvents and detergents, as, for instance, by a hydrocarbon solvent such as kerosene or naphtha, without swelling or dissolving of the tile. Stains on conventionally plasticized floor tiles, on the other hand, could not be effectively eradicated with these or like cleansers.

*Example 2*

The monomer mixture of Example 1, except that 9 parts methoxyethyl acrylate were used in place of the 2-ethoxyethyl acrylate, was polymerized as described in Example 1.

A floor tile was prepared by milling 40 parts of this copolymer with 60 parts of finely divided calcium carbonate. The tile was flexible and completely resistant to hexane. A similar tile, prepared with the 2-ethylhexyl acrylate terpolymer (polymer I) as binder, absorbed 30% of its weight when soaked in hexane at 25° C. for 16 hours.

*Example 3*

A copolymer was prepared according to the formula and procedure of Example 1, except that butoxyethyl acrylate was used in place of the 2-ethoxyethyl acrylate and in the same amount. A floor tile with a 40/60 binder-filler ratio, made from this copolymer, was highly flexible and absorbed 14% of its weight in hexane in the test described in Example 2.

*Example 4*

This example illustrates the preparation and use of an emulsion resin. The formula follows.

| Ingredient: | Parts |
|---|---|
| Vinyl chloride | 27 |
| Vinyl acetate | 4.5 |
| Cellosolve acrylate | 13.5 |
| Sodium lauryl sulfate | 0.6 |
| Potassium persulfate | 0.41 |
| Water | 139 |

The ingredients were charged into a pressure vessel and then agitated for 15 hours at approximately 40° C.

The latex was coagulated by freezing and the separated copolymer washed several times with water followed by methanol.

A mixture of 40 parts of this resin and 60 parts of the calcium carbonate were milled at 115° C. into a uniform, flexible sheet. After 16 hours' immersion in hexane at 25° C., the weight increase was only 2.7%.

*Example 5*

This example illustrates the use of a polyalkoxy acrylate and a modifier. The formula follows.

| Ingredient: | Parts |
|---|---|
| Vinyl chloride | 21.0 |
| Vinyl acetate | 3.5 |
| Methyl Carbitol acrylate | 10.5 |
| Modifier, carbon tetrachloride | 1.75 |
| Lauroyl peroxide | 0.2 |
| Polyvinyl alcohol | 0.25 |
| Water | 67.5 |

The ingredients were charged into a pressure vessel and polymerized as in Example 1. The polymer obtained was milled in the proportion of 40 parts with 60 of calcium carbonate to form a uniform and flexible sheet. The hexane pick-up was less than 1% after soaking for 16 hours at 25° C.

*Example 6*

This example illustrates the use of a mercaptan modifier.

| Ingredient: | Parts |
|---|---|
| Vinyl chloride | 24.5 |
| 2-ethoxyethyl acrylate | 10.5 |
| Lauryl mercaptan | 0.35 |
| Lauroyl peroxide | 0.30 |
| Polyvinyl alcohol | 0.25 |
| Water | 67.5 |

The ingredients were charged into a pressure vessel and polymerized as in Example 1. The polymer obtained was milled in the proportion of 35 parts to 65 of filler material to form a uniform and flexible sheet. Resin made using the same formula but omitting the mercaptan could not be fused at temperatures as high as 150° C.

*Example 7*

When lauryl mercaptan (0.35 part) was employed in the composition of Example 1, the only other change being to increase the lauroyl peroxide to 0.30 part, the milling range of the resin was increased and the resulting tile was considerably more flexible.

*Example 8*

| Ingredient: | Parts |
|---|---|
| Vinyl chloride | 21.0 |
| Vinyl acetate | 3.5 |
| B-ethoxy-ethyl acrylate | 10.5 |
| Iso-octyl thioglycolate | 0.35 |
| Lauroyl peroxide | 0.30 |
| Polyvinyl alcohol | 0.25 |
| Water | 67.5 |

The polymerization was carried out as described in Example 1. Floor tiles made from 35 parts of this resin and 65 parts of filler had greater flexibility than tiles made up from resins using the same formula without modifier.

It is to be understood that it is intended to cover all changes and modifications of the examples of the invention herein chosen for the purpose of illustration which do not constitute departures from the spirit and scope of the invention.

We claim:

1. A resin that is resistant to swelling in contact with aliphatic hydrocarbon liquids, the resin comprising a terpolymer of vinyl chloride; an alkoxyalkyl acrylate of the fromula $CH_2=CH-CO-(OR')_n-OR$ in which R is an alkyl group having 1 to 4 carbon atoms, R' is an alkylene group having 2-4 carbon atoms, and $n$ is an integer within the range 1 to 10; and a monomer selected from the group consisting of vinyl acetate, vinyl butyrate, and vinyl 2-ethylhexoate and $C_2-C_{12}$ alkyl esters of acrylic, methacrylic, maleic, fumaric, citraconic, crotonic, and itaconic acids, the proportion of each of said acrylate and said monomer being 10–100 parts by weight for 100 of the vinyl chloride.

2. A resin that is resistant to swelling in contact with aliphatic hydrocarbon liquids, the resin comprising a terpolymer of vinyl chloride, vinyl acetate, and an alkoxyalkyl acrylate of the formula $$CH_2=CH-CO-(OR')_n-OR$$

in which R is an alkyl group having 1–4 carbon atoms, R' is an alkylene group having 2–4 carbon atoms, and $n$ is an integer within the range 1 to 3, the proportion of said acetate being 10–100 parts by weight and of said acrylate being 20–60 parts by weight for 100 of the vinyl chloride.

References Cited in the file of this patent

UNITED STATES PATENTS

| | | |
|---|---|---|
| 2,458,888 | Rehberg | Jan. 11, 1949 |
| 2,570,861 | Roedel | Oct. 9, 1951 |

FOREIGN PATENTS

| | | |
|---|---|---|
| 159,360 | Australia | Oct. 18, 1954 |
| 476,727 | Great Britain | Dec. 14, 1937 |
| 570,331 | Great Britain | July 3, 1945 |
| 570,348 | Great Britain | July 3, 1945 |
| 587,445 | Great Britain | Apr. 25, 1947 |